United States Patent
Rast et al.

(10) Patent No.: US 6,899,740 B2
(45) Date of Patent: May 31, 2005

(54) SYSTEMS AND METHODS OF ENHANCING CONSUMABLE PRODUCTS

(76) Inventors: Rodger H. Rast, Rastar Corporation 11292 Coloma Rd. Suite L, Gold River, CA (US) 95670; Robert W. Rast, Rastar Corporation 11292 Coloma Rd. Suite L, Gold River, CA (US) 95670

( * ) Notice: Subject to any disclaimer, the term of this patent is extended or adjusted under 35 U.S.C. 154(b) by 138 days.

(21) Appl. No.: 10/016,852

(22) Filed: Dec. 13, 2001

(65) Prior Publication Data

US 2003/0129291 A1 Jul. 10, 2003

Related U.S. Application Data

(60) Provisional application No. 60/256,887, filed on Dec. 15, 2000.

(51) Int. Cl.[7] .................................................. C10L 5/00
(52) U.S. Cl. ......................... 44/531; 44/532; 44/534; 44/535; 44/541
(58) Field of Search ................... 44/531, 532, 534, 44/535, 541

(56) References Cited

U.S. PATENT DOCUMENTS

| | | | | |
|---|---|---|---|---|
| 1,084,369 A | * | 1/1914 | Smith | 44/531 |
| 1,191,458 A | | 7/1916 | Phillips | |
| 1,743,388 A | * | 1/1930 | Pohlson | 44/541 |
| 3,297,419 A | | 1/1967 | Eyre, Jr. | |
| 3,395,003 A | | 7/1968 | Alexander | |
| 4,043,765 A | | 8/1977 | Tanner | |
| 4,060,396 A | * | 11/1977 | Burton | 44/531 |
| 4,104,034 A | | 8/1978 | Wu et al. | |
| 4,243,394 A | | 1/1981 | Kincaid | |
| 4,272,252 A | * | 6/1981 | Altman | 44/502 |
| 4,485,584 A | * | 12/1984 | Raulerson et al. | 44/531 |
| 4,539,011 A | | 9/1985 | Kretzschmann | |
| 5,575,275 A | | 11/1996 | Gazaille | |
| 5,711,766 A | * | 1/1998 | Bain | 44/530 |
| 5,958,090 A | * | 9/1999 | Chandaria | 44/535 |
| 6,017,373 A | | 1/2000 | Frisch | |
| 6,132,481 A | | 10/2000 | Chandaria | |
| 6,196,215 B1 | | 3/2001 | Chandaria | |
| 6,251,147 B1 | | 6/2001 | Peterson et al. | |
| 6,508,849 B1 | * | 1/2003 | Comas | 44/543 |

FOREIGN PATENT DOCUMENTS

JP           02142893     *   5/1990

* cited by examiner

*Primary Examiner*—Cephia D. Toomer
(74) *Attorney, Agent, or Firm*—Rodger H. Rast

(57) ABSTRACT

Combustion rate adjustable firelogs and methods of manufacturing are described. One aspect of the present invention are firelogs manufactured with an integral combustion shield for covering a portion of the surface area of the firelog that may be selectively utilized to set the duration and burning rate as the manufactured firelog is consumed during the fire. By way of example and not of limitation, the integral combustion shield is made of a thin flame resistant or non-flammable material, such as aluminum, which covers a portion of the firelog to control the combustion rate. Another aspect of the invention is the adaptation of wrapped firelogs so that they may be easily divided while retaining wrapper portions thereupon. Another aspect of the invention is the adaptation of the shapes of the firelogs so that they may be utilized either separately or in combination with one another.

44 Claims, 3 Drawing Sheets

SYSTEMS AND METHODS OF ENHANCING CONSUMABLE PRODUCTS

CROSS-REFERENCE TO RELATED APPLICATIONS

This application claims priority from U.S. provisional application Ser. No. 60/256,887 filed on Dec. 15, 2000 which is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The invention pertains generally to manufactured firelogs and more particularly to a consumption rate adjustable firelog.

2. Description of the Background Art

The use of manufactured firelogs has increased as consumers more often seek the warmth and comfort of a fireplace fire without the bother of starting a wood fire that requires the use of kindling, and other fire starting materials. In addition, the manufactured firelogs are typically safer and require less "tending" than wood fires. Furthermore, recent advances in firelog materials have resulted in the production of firelogs which burn cleaner than those of wood burning fires.

One of the determining factors for a consumer choosing a manufactured firelog, is the duration of the fire that it will produce. It will be appreciated that an artificial firelog, once consumed in flames, may not be readily, or advisably, extinguished. Extinguishing a lit firelog, is a risky proposition as the flammable waxes can be easily spread to overheat the fireplace or consume materials outside the fireplace area.

In addition, the consumer has no control over the heat generated by the use of the manufactured firelog. These logs will generate a given amount of heat for their specific size and configuration in relation to the draft through the fireplace and the air-space existing about the log. Often the burning of a manufactured firelog product can generate such a large quantity of heat that those sitting in front of the fireplace can be made uncomfortable, however, they have had no recourse. Furthermore, flue fires can result when a fire produces excessive heat for the given fireplace, or when the flue has not been regularly maintained. This is especially true today as a large percentage of all fireplaces made today are small drop-in units that employ small cylindrical metal flues. In many cases fireplaces are never, or rarely, cleaned, such is the case with a number of apartment complexes. Houses and apartments have been burnt to the ground in numerous instances in which flue residues catch fire at a high heat intensity and therein ignite nearby structural elements of the dwelling. Further complicating this is the nature of the construction on these logs. A conventional fire can be prodded and arranged to reduce the size of the flames and thereby reduce the risk. A manufactured firelog, by contrast, will generate MORE heat if disturbed as it breaks up into tiny fragments so that more of the wood pulp impregnated with flammable residues are available to burn. Currently, consumer choices are limited with regard to the choice of manufactured firelog products.

As can be seen therefore a need exists for a firelog, and method of manufacturing same, that allows consumers to control the burn rate and heat production of a manufactured firelog product prior to ignition of that product. The consumption rate adjustable firelog products in accordance with the present invention satisfies those needs, as well as others, and overcome deficiencies in previously known techniques.

BRIEF SUMMARY OF THE INVENTION

The present invention describes a manufactured firelog and method of making firelog products, in which the consumption rate of the firelog may be set by the consumer prior to starting the fire. The benefits of providing an adjustable consumption rate will be readily appreciated, in that the consumer will no longer be required to purchase logs with different burning intervals, or be subjected to firelogs generating excessive heat levels.

Manufactured firelogs are manufactured by agglomerating combustible materials, such as wood chips and wood containing by-products with binding agents and combustion aids, such as wax. Typically, manufactured firelogs are produced within an extrusion process. It will be recognized that when burning a log, the maximum heat output is generated when the largest amount of log surface area is being combusted in the flames while the oxygen within the surrounding air freely circulates or is being forced into the fire surrounding the firelog. The amount of heat generated by the firelog is a function of the surface area consumed by flame. The present invention recognizes that the problem faced by consumers with regard to manufactured firelog size selection, and excessive heat generation are both related to the consumable surface area of the firelog product which is generally manufactured by agglomerating a combustible material into a shape such as a firelog shape. One aspect of the present invention are firelogs manufactured with an integral combustion shield for covering a portion of the surface area of the firelog that may be selectively utilized to set the duration and burning rate as the manufactured firelog is consumed during the fire. By way of example and not of limitation, the integral combustion shield is made of a thin flame resistant or non-flammable material, such as aluminum, which covers a portion of the firelog to control the combustion rate. The combustion shield may be adhered to the surface of the firelog, to a wrapper, or held between the wrapper and firelog, so that it shields a portion of the surface of the manufactured firelog to prevent uncontrolled amounts of oxygen within the air from reaching the firelog. The combustion shield may comprise a single element, or a multiplicity of elements, and may be formed from a solid material, for instance a metallic foil, or applied as a particulate or liquid layer to the exterior of a firelog, or its wrapper, during manufacture. Prior to setting the firelog ablaze, the user selects the orientation of the firelog, and thereby the position of the combustion shield according to the amount of heat, or duration desired. If the firelog is placed so that the combustion shield is above the material of the firelog, then the firelog burns relatively conventionally, as the shield drops away as the wrapper turns to ashes. If, however, the firelog is oriented with at least a portion of the combustion shield under the firelog, retained in place by the fireplace grate or other surface on which the firelog rests, then the consumption rate of the firelog is reduced for a portion of the duration of the burn. Combustion shields according to the present invention may be incorporated onto the surface of unwrapped firelog products, or integrated into the wrapper of a wrapped manufactured firelog, wherein it may further be selectively disengaged therefrom.

Another aspect of the invention is the adaptation of wrapped firelogs so that they may be easily divided while retaining wrapper portions thereupon. It will be appreciated that the wrapping on a firelog generally contains the material which allows for easy ignition of the firelog. The division of a wrapped firelog allows the consumer to select the size and duration of the fire to be burned. It will further be appreciated that separated portions may be burned at the same time, wherein the heat produced will be increased while the overall burning times reduced. Another aspect of a segmented firelog may be utilized on wrapped or unwrapped firelogs which incorporate one or more embedded materials to aid in the ignition of the firelog.

Another aspect of the invention is the adaptation of the shapes of the firelogs so that they may be utilized either separately or in combination with one another. By configuring the firelogs in this way the consumer may elect the size and duration of the fire they wish to burn at a particular time. They may use the separate sections for small fires of various short durations, or combine the sections in predetermined ways to burn a fire of extended duration or extended heat production. By way of example, a large wrapped firelog is configured for receiving a smaller wrapped firelog, wherein either the smaller or larger firelog may be burned separately, or the two firelogs may be burned in the predetermined combination. It is preferable that the large and small logs be nested and attached to one another with a temporary attachment means, such as a conventional low-tack adhesive, which allows the firelogs to be separated without removing the wrappers. These "combinable firelogs" may be sold in boxes like traditional firelogs and they allow the consumer a choice as to the burn times and heat generated by the fire. It will be appreciated that this aspect of the invention may be combined with the firelog segmentation described above and the burning rate selectable shields wherein the consumer gains additional control over the burn rate of the firelogs.

An object of the invention is to provide a manufactured firelog product in which the consumer may select the duration of burn or the amount of heat generated by the firelog as it burns.

Another object of the invention is to provide a manufactured firelog product that may be manufactured with conventional equipment.

Another object of the invention is to provide a method of controlling the burn rate of a manufactured firelog product which can be manufactured inexpensively.

Another object of the invention is to provide a method of controlling the burn rate of a manufactured firelog product wherein the consumer can select a desired combustion rate prior to ignition of the manufactured firelog product.

Another object of the invention is to provide a mechanism by which consumers uncertain of the heat safety of their fireplaces may burn the manufactured firelog at the low intensity long duration setting.

Another object of the invention is to provide a method by which the amount of air reaching the surface of the manufactured firelog is controlled so as to alter the speed with which the firelog is consumed by fire.

Another object of the invention is to provide a method by which a non-abrupt transition between areas of the manufactured firelog consumed in flames and those protected by the shield.

Another object of the invention is to provide a method of segmenting manufactured firelogs so that the user may control the size and duration of the resultant fire.

Another object of the invention is to provide a method of making firelogs in various shapes and sizes that allow burning the manufactured firelogs individually or in nested combinations with one another.

Another object of the invention is to reduce the risk of flue fires and the associated liability, by incorporating a safety device into the firelog and cautioning the consumer to utilize only the slow burn rate setting if they are uncertain about the heat capacity of their fireplace.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts without departing from the basic concepts as disclosed herein.

Figure 1:
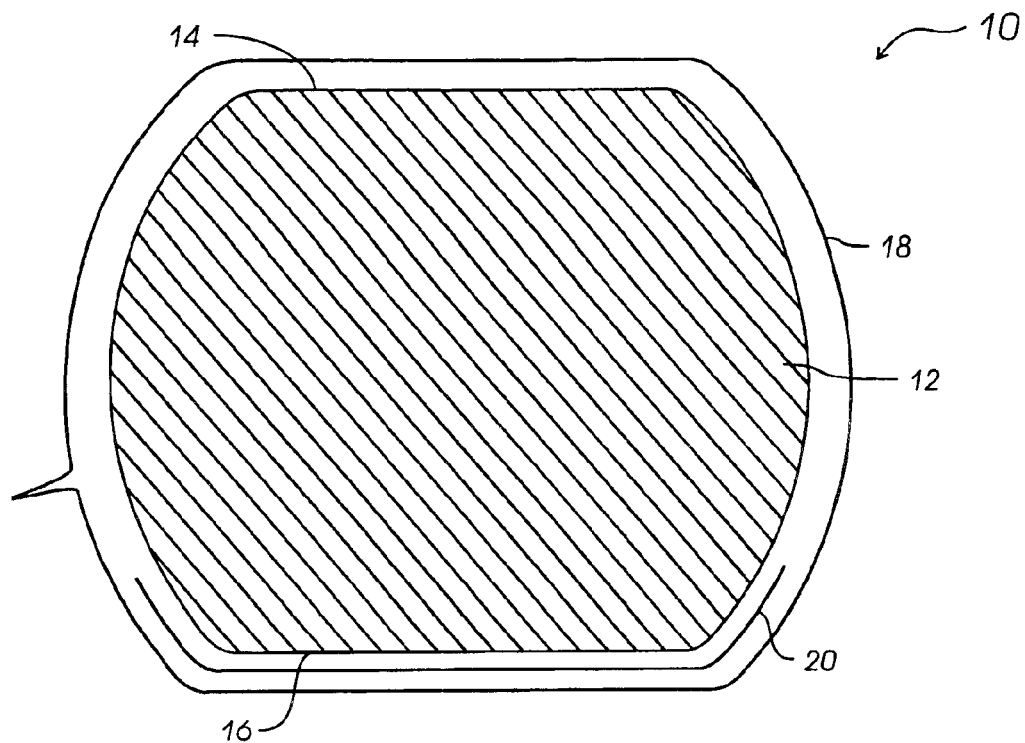
FIG. 1 is a cross-section of a manufactured firelog having a wrapper with an integrated combustion shield according to an embodiment of the present invention.

Referring first to FIG. 1 is an illustration 10 of a manufactured firelog with a wrapper having an integrated combustion shield according to the present invention. The manufactured log 12 may be of any construction, yet is typically of pressed wood particles, cardboards, and so forth which are bound together with binders such as wax. The manufactured firelog is shown by way of example with a flattened top 14 and flattened bottom 16 to facilitate positioning for lighting. It will be appreciated that the majority of manufactured firelogs have a geometric configuration wherein the log is capable of setting in a stable position in one or more orientations, such that the strip for lighting the log can be retained in a particular annular position. To provide a clean "over-the-counter" product, to retain the moisture content, and to facilitate lighting, a wrapper 18 is generally provided.

The non-flammable combustion shield 20 is shown positioned in the lower portion of the log 16 within the wrapper. The combustion shield may be fabricated of any thin non-flammable material and is preferably manufactured from a foil of aluminum. It will be appreciated that the combustion shield may alternatively be incorporated onto the log itself, retained between the log and wrapper, or integrated into the wrapper. The surface (combustion) shield may be configured to cover any portion of the log surface, generally so long as a portion of the log surface remains for initial combustion. The combustion shield may be created from a solid section of material, or it may be manufactured from sections of material. In addition, the combustion shield may be manufactured from a material which has been configured with perforations. The perforations, although they may allow limited combustion to occur through the perforations still operate to restrict the amount of combustion, and thereby reduce the overall consumption rate.

Consumption of the firelog 10 within the flame containing the combustion shield 20 can be accomplished with the shield in any orientation, however, in the embodiment shown the shield is preferably placed either at the top, or the bottom of the log while burning. It will be recognized that the exterior of the wrapper should contain instructions as per the use of the adjustable consumption firelog, and in particular the relevance of positioning the combustion shield. Burning the firelog with the shield in the downward position, as shown in FIG. 1, results in slower consumption of the firelog as less of the log surface is subject to combustion and the free flow of air. Preliminary tests with a combustion shield spanning approximately 30% of cylindrical exterior of the log surface have shown decreased consumption rates on the order of 15–20%. It is anticipated that various configurations of combustion shields will be easily capable of providing consumption rate changes of up to 35%–40%.

One advantage of using a log equipped with the combustion shield, is that it may still be burned conventionally, whereby orienting the firelog 10 with the combustion shield on the top will result in a consumption rate that is identical with a conventional firelog. As the log is ignited, the wrapper burns away and the shield falls away from on top of the log, as nothing exists to retain the shield in a fixed position. It is preferable that the combustion shield be configured to fall towards the rear of the log, so that it cannot interfere with viewing of the firelog while it is burning, however, by utilizing thin shield materials this is not required.

Figure 2:
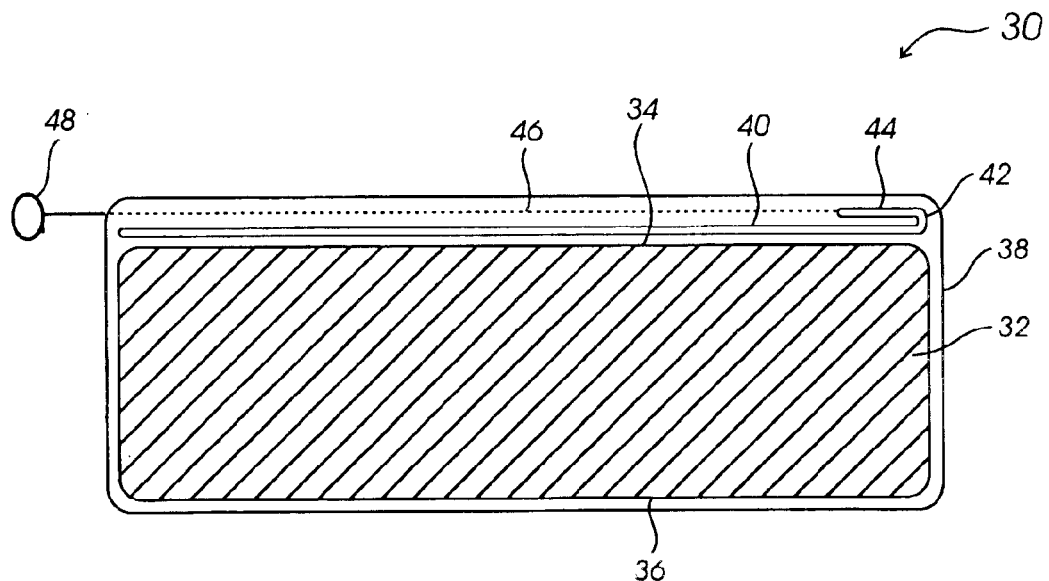
FIG. 2 is a cross-section of a manufactured firelog shown lengthwise having a wrapper and a removable combustion shield according to an embodiment of the present invention, and shown with a pull cord for removal of the combustion shield.

FIG. 2 exemplifies 30 another embodiment of the present invention wherein the combustion shield is removable prior to ignition of the firelog. The pressed firelog 32 has a top 34 and bottom 36 and a wrapping 38. Shown in this view above the log surface 34, is a combustion shield 40 which is configured for removal. To facilitate clean removal, the top portion of the shield 40 is folded over 42 with an attachment area 44 to which a pull-string 46 is connected. The pull-string exits the wrapper 38 and preferably terminates in a graspable tab 48, which may be implemented as a ring, tab, or similar easily grasped mechanism.

Figure 3:
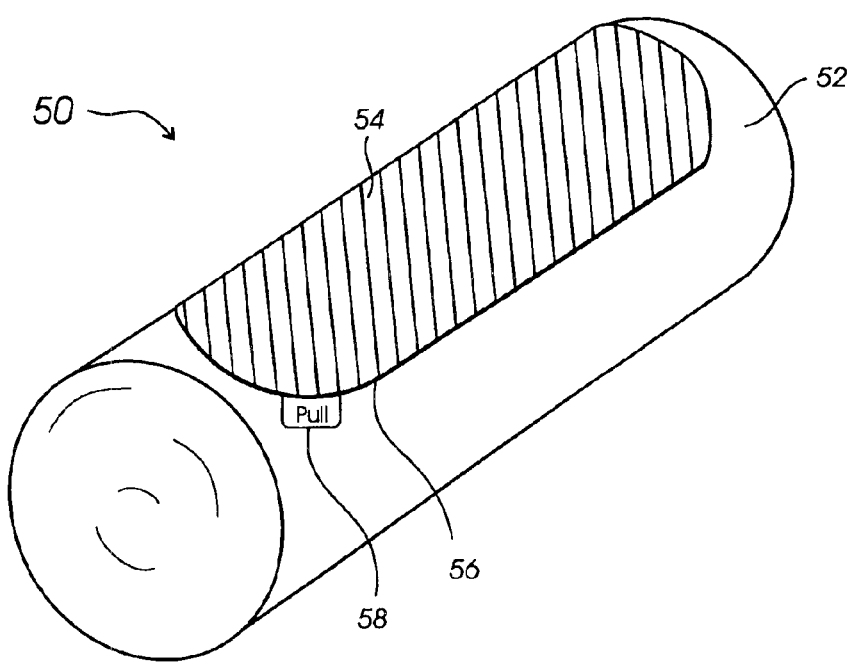
FIG. 3 is a perspective view of an unwrapped firelog having an integral combustion shield according to an embodiment of the present invention.

FIG. 3 exemplifies 50 an embodiment of the invention upon a firelog product that is not provided with a wrapper. The surface of the firelog 52 is configured with a combustion shield 54 attached thereupon with an outer edge 56 to which an optional tab 58 may be provided to allow for removal of the combustion shield.

Figure 4:
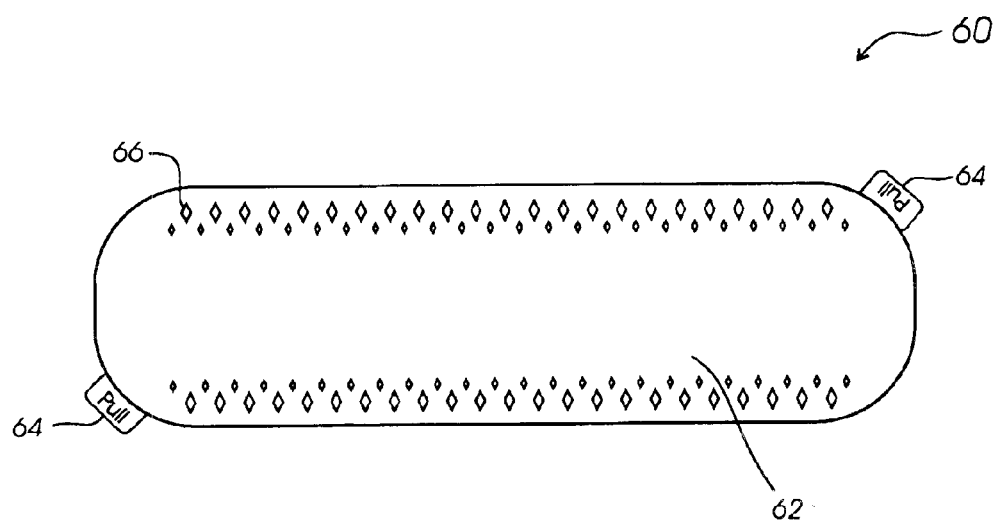
FIG. 4 is a plan view of a combustion shield according to an aspect of the present invention, shown with apertures and pull-tabs.

FIG. 4 is a combustion shield 60 shown separated from a firelog according to an embodiment of the present invention which can be configured for application to a firelog product. The combustion shield 60 comprises a flame resistant or fireproof material 62, shown with optional tabs 64 to facilitate application and/or removal. The combustion shield is preferably formed from an inexpensive metallic material, such as a foil of aluminum, of up to approximately 30 mils thickness. It will be appreciated however, that the combustion shield need not reduce, or prevent, combustion within a particular area for the entire time period that the firelog is being burned, therefore, the combustion shield may be formed from any material that is slower burning than the agglomerated combustible material of the manufactured firelog. The shield may be attached to the surface of a firelog, or its associated wrapper so that the burning duration of the firelog may be adjusted by the consumer prior to ignition of that firelog product. The shield material 62 is shown with perforations 66 about the periphery wherein a small portion of the firelog may be partially burned to provide for a natural, non-abrupt, transition region between areas which are ignited and those which are not.

It will further be appreciated that the material of the combustion shield may be selected to provide numerous effects. For example, the shield may be constructed so that it disintegrates after a predetermined period of time has elapsed, wherein the log as it gets smaller is then allowed to burn sans the combustion shield. In addition, the combustion shield may be constructed of a mixture of materials, for instance whereby the edges of the material deter burning for a shorter duration that the materials chosen for the core of the combustion shield.

Using of materials with slightly different flammable volatility, firelogs may be manufactured with more controlled burning profiles. These firelogs would be preferably manufactured with a modified extrusion process wherein materials of different flammability are formed together during extrusion to form a firelog having material variability across a cross section. For example, a core of material having a higher flammability results in a firelog whose heat output can be more constant as the exterior of the firelog is burned off. It will be appreciated that within traditional firelogs the amount of heat generated is determined by the exterior surface area, wherein the amount of heat generated diminishes as the log burns toward its interior. Creating a firelog with exterior portions of different combustion material allows rotation of the firelog to control the position of different materials and thereby control selected effects, such as burn rate, direction of popping (when popping additives are added), and so forth.

Figure 5:
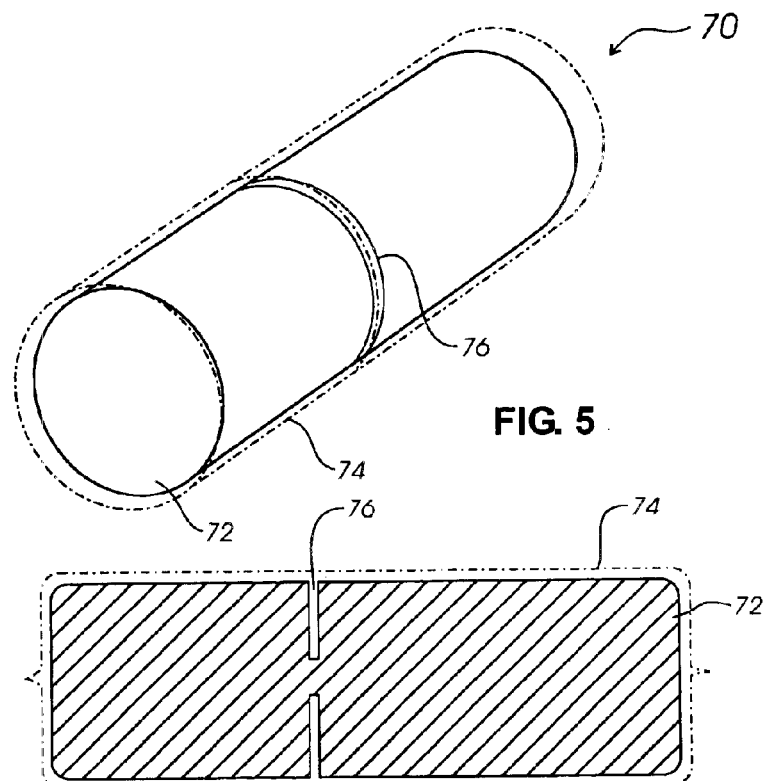
FIG. 5 is a perspective view of a firelog according to an aspect of the present invention, shown configured for separation into predetermined sections.
Figure 6:
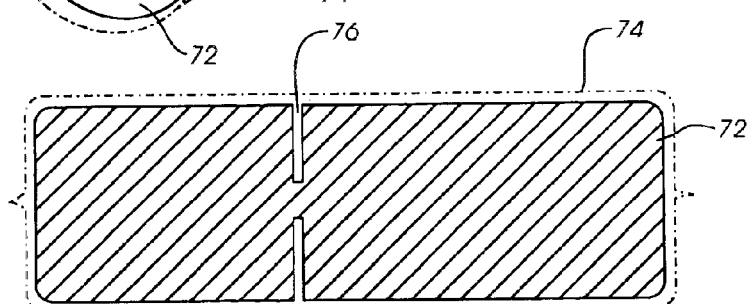
FIG. 6 is a side view of the firelog of FIG. 5, showing notches within the firelog which facilitate separation into sections.

FIG. 5 depicts an embodiment 70 having a firelog 72 with a wrapper 74 that are both configured for easily being separated in sections, such as along the markings 76. FIG. 6 illustrates a side view of the firelog 72 showing notches 76 which facilitate the separation of the firelog into sections, such as exemplified by the two unequal length sections shown. The notches may be configured in a number of ways that allow the firelog to be easily broken, cut, or otherwise divided by the consumer into sections. It will be appreciated that the firelog may be manufactured with any number of notches, or other similar adaptations which allow the consumer to divide the firelog to control burn rate. It will be appreciated that any lighting strip within the firelog of FIG. 5 and FIG. 6 should similarly be configured to allow the consumer to easily separate the sections of the firelog.

Figures 7, 8, 9:
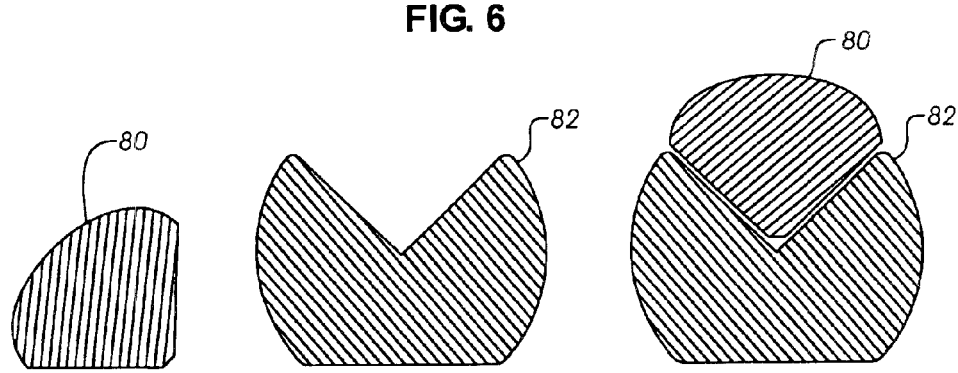
FIGS. 7–9 are end views of combinable firelogs according to an aspect of the present invention, shown for burning separately or on a nested combination.

FIG. 7 through FIG. 9 illustrate another aspect of the invention which provides combinable firelogs, such as of various sizes and shapes, so that the consumer can control the duration and heat output from the fire. It will be appreciated that utilizing multiple conventional firelogs, has little impact on the duration of the fire, as the surface area of the firelogs which is exposed to the flame is independent of the number of firelogs placed in the fire. FIG. 7 depicts a small firelog 80 with a wedge-shaped cross-section, which is configured for nesting within a larger firelog 82 shown within FIG. 8 to create a combination firelog as shown in FIG. 9. The firelogs created in combinable shapes can be burned separately or combined into the larger shape of FIG. 9, depending on the desired duration and/or heat output. Preferably, the combinable firelogs are individually wrapped to facilitate lighting and to maintain cleanliness. To facilitate packaging, the firelogs may also be joined, such as using a non-permanent adhesive, wherein the firelogs may be easily separated by the user if they want to start a fire that lasts for less duration than that provided by the combination firelog. It will be appreciated that any number of nested firelogs, of various shapes, may be combined into the combinable firelogs of the present invention.

Accordingly, it will be seen that this invention of an adjustable burn rate firelog product provides a firelog, and methods for constructing a firelog, which allows the consumer to select the desired consumption rate and thereby the heat output from the firelog. It will be recognized by anyone of normal skill in the art that the invention may be implemented in a variety of ways without departing from teachings of the present invention. Embodiments have been exemplified showing configurations of firelogs and combustion shields, however, the materials and configurations are subject to wide variations without departing from the inventive teachings.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A manufactured firelog providing consumer selected control of burning rate, comprising:
   a combustible material agglomerated into a shape having top and bottom surface configured for supporting the firelog during combustion and dimensioned for use as a combustible firelog;
   a flammable wrapper surrounding said combustible firelog; and
   at least one combustion shield joined to said flammable wrapper adjacent said top or bottom surface to reduce the air reaching a portion of the surface of said combustible firelog;
   wherein said combustion shield comprises a fireproof or fire resistant material;
   wherein consumer positioning of said combustible firelog for burning with said combustion shield retained underneath said combustible firelog shields that portion of said combustible material from air to reduce the burning rate; and
   wherein burning of said combustible firelog with said combustion shield retained on an upper portion of said combustible firelog allows the combustion shield to separate from the combustible firelog as said wrapper burns so that the combustion shield does not substantially impact burning rate.

2. A manufactured firelog as recited in claim 1, wherein said combustion shield is adapted with apertures disposed on at least portions of its surface which increase the available combustible firelog surface area in relation to a combustion shield without said apertures.

3. A manufactured firelog as recited in claim 1:
   wherein said combustion shield is configured to allow full or partial removal at consumer's discretion to expose additional portions of said firelog prior to burning;
   wherein the rate of combustion is selected by said consumer prior to igniting said firelog, in response to orientation of said firelog and the extent, if any, of discretionary combustion shield removal.

4. A manufactured firelog as recited in claim 3, further comprising means for grasping attached to said combustion shield to facilitate full or partial removal of said shield.

5. A manufactured firelog having an adjustable combustion rate, comprising:
   combustible material agglomerated into a combustible firelog; and
   means for selectively shielding an exterior surface portion of said firelog from combustion during a portion of the time that said firelog is being burned;
   wherein said selective shielding means is configured to selectively change the combustion rate of said firelog by restricting the airflow reaching portions of the surface of the firelog:
   wherein a consumer can select the amount of shielding retained under said firelog.

6. A manufactured firelog as recited in claim 5:
   wherein said means for selectively shielding said firelog comprises a combustion shield of a fire-resistant or fireproof material;
   wherein said combustion shield is positioned proximal to said firelog to restrict airflow from reaching portions of the surface of the firelog to reduce the resulting combustion rate;
   wherein said selective shielding means is configured so that when it is not oriented under said firelog during combustion, the shielding means falls away as the surrounding portions of the wrapper burn away.

7. A manufactured firelog as recited in claim 6, wherein said combustion shield comprises a metallic foil material.

8. A manufactured firelog as recited in claim 7, wherein said metallic foil is less than approximately 30 mils thick.

9. A manufactured firelog as recited in claim 6, wherein said combustion rate may be adjusted by positioning at least a portion of said combustion shield on the underside of said firelog.

10. A manufactured firelog as recited in claim 6, wherein said combustion shield is attached to the surface of said firelog.

11. A manufactured firelog as recited in claim 6, wherein said combustion shield is joined to a flammable wrapper surrounding said firelog.

12. A manufactured firelog as recited in claim 9, wherein said combustion shield further comprises means for grasping configured for allowing a consumer to fully or partially remove said combustion shield to alter the combustion rate.

13. In a manufactured firelog having a combustible material that has been formed into a shape dimensioned for use as a combustible firelog, wherein the improvement comprises:

forming said manufactured firelog as a plurality of separate complementary shapes configured for arrangement in a nested combination during burning;

surrounding each complementary shape with a flammable wrapper; and wherein the complementary shapes may be burned separately to provide one level of heat output and fire duration, or nested together in combination to provide a second level of heat output and fire duration.

14. In a manufactured firelog formed from an agglomeration of combustible material in a shape dimensioned for use as a combustible firelog product, wherein the improvement comprises:

incorporating a combustion shield of a fire-resistant or fireproof material positioned to cover a portion of the surface of said firelog to restrict air from reaching portions of the surface of the firelog to reduce the combustion rate;

wherein said firelog is configured so that said combustion shield can be oriented under said firelog to provide a first burning rate, or oriented in other positions to provide a second burning rate which is higher than said first burning rate.

15. The manufactured firelog as recited in claim 14, wherein said combustion shield comprises a flexible metallic foil attached to a flammable wrapper surrounding said firelog.

16. The manufactured firelog as recited in claim 15, wherein said combustion shield is configured for full or partial removal from said firelog to alter the amount of firelog surface area being covered by said combustion shielding thereby altering the resulting combustion rate.

17. A manufactured firelog as recited in claim 1, wherein said combustion material comprises combustible materials, binding agents, and solid combustion aids.

18. A manufactured firelog as recited in claim 1, wherein combustion shield attached to the wrapper is configured to fall away from the firelog as the surrounding portions of the wrapper are burned away.

19. A manufactured firelog as recited in claim 5, wherein the surface area of the shield retained under the firelog can be selected by the consumer in response to orienting of the firelog and shield means to select the extent, if any, that the shielding means is retained beneath the underside of the firelog.

20. A manufactured firelog as recited in claim 19, wherein said combustible firelog is configured so that said selective shielding means can be oriented under said firelog to provide a first burning rate, or oriented away from the underside of the firelog to provide a second burning rate which is higher than said first burning rate.

21. A manufactured firelog, comprising:

a combustible material formed into a first firelog portion of a first shape; and a combustible material formed into a second firelog portion of a second shape;

wherein said second shape is configured for being nested with said first shape;

a combustible wrapper separately covering each of said first and said second firelogs;

whereby the nested combination of first and second firelog portions may be burned as a single unit or separated from one another and either firelog portion burned individually.

22. A manufactured firelog as recited in claim 21, further comprising means for separably adhering the wrapper of said first firelog with the nested configuration with said second firelog.

23. A manufactured firelog having a selectable combustion rate, comprising:

a combustible material agglomerated into a shape having top and bottom surface configured for supporting the firelog during combustion and dimensioned for use as a combustible firelog;

a flammable wrapper surrounding said combustible firelog;

at least one combustion shield joined to said flammable wrapper adjacent said top or bottom surface to reduce the air reaching a portion of the surface of said combustible firelog;

wherein said combustion shield comprises a fire proof or fire resistant material;

wherein said combustion shield is adapted with apertures disposed on at least portions of its surface which increase the available combustible firelog surface area in relation to a combustion shield without said apertures;

wherein consumer positioning of said combustible firelog for burning with said combustion shield retained underneath said combustible firelog shields that portion of said combustible material from air to reduce the burning rate; and wherein burning of said combustible firelog with said combustion shield retained on an upper portion of said combustible firelog allows the combustion shield to separate from the combustible firelog as said wrapper burns so that the combustion shield does not substantially impact burning rate.

24. A manufactured firelog as recited in claim 23, wherein said combustion shield is configured to allow full or partial removal at consumer's discretion to expose additional portions of said firelog prior to burning.

25. A manufactured firelog as recited in claim 24, further comprising means for facilitating the full or partial removal of said combustion shield.

26. A manufactured firelog having a selectable combustion rate, comprising:

a combustible material agglomerated into a combustible firelog; and means for selectively shielding an exterior surface portion of said firelog from combustion during a portion of the time that said firelog is being burned;

wherein said selective shielding means is configured as fire-resistant or fireproof material positioned proximal to said firelog to selectively change the combustion rate of said firelog by restricting the airflow reaching portions of the surface of the firelog;

wherein a consumer can select the amount of shielding retained under said firelog.

27. A manufactured firelog as recited in claim 26, wherein said combustion shield comprises a metallic foil material.

28. A manufactured firelog as recited in claim 26, wherein said combustion shield is attached to the surface of said firelog.

29. A manufactured firelog as recited in claim 26, wherein said combustion shield is joined to a flammable wrapper surrounding said firelog.

30. A manufactured firelog as recited in claim 26, further comprising means for facilitating the full or partial removal of said combustion shield.

31. A manufactured firelog having a selectable combustion rate, comprising:
   a combustible material agglomerated into a combustible firelog; and
   means for selectively shielding an exterior surface portion of said firelog from combustion during a portion of the time that said firelog is being burned;
   wherein said selective shielding means is configured as fire-resistant or fireproof material positioned proximal to said firelog to selectively change the combustion rate of said firelog by restricting the airflow reaching portions of the surface of the firelog;
   wherein a consumer can select the amount of shielding retained under said firelog;
   wherein said selective shielding means is joined to a flammable wrapper surrounding said firelog and configured so that when it is not oriented under said firelog during combustion, the shielding means falls away as the surrounding portions of the wrapper burn away.

32. A manufactured firelog as recited in claim 31, wherein said combustion shield comprises a metallic foil material.

33. A manufactured firelog as recited in claim 31, further comprising means for facilitating the full or partial removal of said combustion shield.

34. A manufactured firelog having a selectable combustion rate, comprising:
   combustible material agglomerated into a combustible firelog; and
   means for selectively shielding an exterior surface portion of said firelog from combustion during a portion of the time that said firelog is being burned;
   wherein said selective shielding means is configured to selectively change the combustion rate of said firelog by restricting the airflow reaching portions of the surface of the firelog;
   wherein a consumer can select the amount of shielding retained under said firelog in response to orienting the firelog and shield means to select the extent, if any, that the shielding means is retained beneath the underside of the firelog.

35. A manufactured firelog as recited in claim 34, wherein said combustion shield comprises a metallic foil material.

36. A manufactured firelog as recited in claim 34, wherein said combustion shield is attached to the surface of said firelog.

37. A manufactured firelog as recited in claim 34, wherein said combustion shield is joined to a flammable wrapper surrounding said firelog.

38. A manufactured firelog as recited in claim 34, further comprising means for facilitating the full or partial removal of said combustion shield.

39. A manufactured firelog having a selectable combustion rate, comprising:
   combustible material agglomerated into a combustible firelog;
   means for selectively shielding an exterior surface portion of said firelog from combustion during a portion of the time that said firelog is being burned;
   wherein said selective shielding means is configured to selectively change the combustion rate of said firelog by restricting the airflow reaching portions of the surface of the firelog;
   wherein a consumer can select the amount of shielding retained under said firelog; and
   wherein user selection of the orientation of said shielding means under said firelog provides a first burning rate, while orienting said shielding means away from the underside of the firelog provides a second burning rate which is higher than said first burning rate.

40. The manufactured firelog as recited in claim 13, further comprising means for separably adhering the wrappers of said separate complementary shapes in their nested configuration.

41. A manufactured firelog having a selectable combustion rate, comprising:
   a combustible material formed into a plurality of separate complementary shapes configured for arrangement in a nested combination during burning;
   a flammable wrapper surrounding each complementary shape configured to allow nesting of the separately wrapped complementary shapes during burning; and
   wherein the complementary shapes may be burned separately to provide one level of heat output and fire duration, or nested together in combination to provide another level of heat output and fire duration.

42. A manufactured firelog as recited in claim 41, further comprising means for separably adhering the wrappers of said separate complementary shapes in their nested configuration.

43. A manufactured firelog having a selectable combustion rate, comprising:
   a combustible material formed into a first and second separate complementary shape configured for arrangement in a nested combination during burning;
   a flammable wrapper surrounding each complementary shape configured to allow nesting of the separately wrapped complementary shapes during burning;
   wherein said separate complementary shapes comprises first and second separate firelog portions which can be arranged in a nested combination during burning;
   wherein said first portion is smaller than said second portion;
   wherein the first firelog portion can be burned separately to provide a first level of heat output and duration;
   wherein the second firelog portion can be burned separately to provide a second level of heat output and duration;
   wherein the first and second firelog portion can be burned in combination a nested configuration to provide a third level of heat output and duration; and
   wherein the first and second firelog portion can be burned un-nested to provide a fourth level of heat output and duration.

44. A manufactured firelog as recited in claim 43, further comprising means for separably adhering the wrappers of said separate complementary shapes in their nested configuration.

* * * * *